United States Patent [19]
Wassen

[11] 3,963,514
[45] June 15, 1976

[54] REMOVAL OF EXCESS METAL FROM THE WELDING SEAM IN THE INTERIOR OF A PIPE

[75] Inventor: Johann Wassen, Brackwede, Germany

[73] Assignee: Mannesmannrohren-Werke AG, Dusseldorf, Germany

[22] Filed: Aug. 14, 1974

[21] Appl. No.: 497,253

[30] Foreign Application Priority Data
Aug. 17, 1973  Germany............................ 2342169

[52] U.S. Cl........................................ 134/8; 134/7; 134/22 C; 134/34
[51] Int. Cl.².................... B08B 3/04; B08B 9/04; B08B 9/06
[58] Field of Search ............... 134/4, 7, 8, 22 C, 34, 134/22 R, 24; 165/95

[56] References Cited
UNITED STATES PATENTS

| | | | |
|---|---|---|---|
| 1,887,722 | 11/1932 | Schoener et al. | 134/22 C X |
| 2,671,035 | 3/1954 | Bergman | 134/22 C UX |
| 3,214,867 | 11/1965 | Henning | 134/22 C X |
| 3,272,650 | 9/1966 | MacVittie | 134/8 X |
| 3,498,838 | 3/1970 | Scott | 134/8 |
| 3,676,091 | 7/1972 | Fraser et al. | 134/8 X |
| 3,825,443 | 7/1974 | Reilly | 134/22 C X |

*Primary Examiner*—Morris O. Wolk
*Assistant Examiner*—Dale Lovercheck
*Attorney, Agent, or Firm*—Ralf H. Siegemund

[57] ABSTRACT

The wire-like, severed welding seam burr is removed from a, possibly, coiled pipe by filling the pipe with water under pressure the water containing solid particles and removing the burr with removal of the water as a column from the pipe.

3 Claims, No Drawings

REMOVAL OF EXCESS METAL FROM THE WELDING SEAM IN THE INTERIOR OF A PIPE

BACKGROUND OF THE INVENTION

The present invention relates to a method for removing welding burrs from the interior of pipes.

Pipes and tubes are made in various manners and, generally speaking, one method of pipe making proceeds by folding a metal strip or sheet and welding the adjoining edges along a longitudinal or helical welding seam, depending on the mode of folding or coiling. In the case of longitudinal (axial) welding, the seam will have burrs, for example, on the inside which have to be removed. As the burrs are severed from the pipe by scraping, one produces a continuous, wire-like burr, which remains in the pipe. This wire-burr has to be removed from the tube. Such a removal is rather simple, if the pipe is a short section or has been cut accordingly. The situation is quite different when the pipe or tube is quite long or has even been coiled. Due to internal friction, just pulling the wire will tighten it on the inside of the pipe as a conforming coil rather than removing it.

DESCRIPTION OF THE INVENTION

It is an object of the present invention to provide a method for removing elongated welding burrs from the inside of long tubes or pipes.

In accordance with the preferred embodiment of the invention, it is suggested to fill a long pipe or tube, still containing the severed burr on the inside, with a liquid, such as water, and to pressurize the water up to 15 to 20 atmospheres (about 200 to 280 psi) and to remove the water from the interior of the pipe under such a high pressure. Bearing in mind that liquids generally and water in particular can be regarded as incompressible, a water column is removed from the pipe as such and carries along the continuous welding seam burr; the latter will just slide out of the same pipe end through which the water is discharged under the stated pressure.

On filling, the pipe may be closed on both ends, except for the filling inlets, and upon pressurization, one end is kept closed while the other pipe end is opened to obtain the discharge.

In furtherance of the invention, it may be advantageous to enhance the engagement between liquid and burrs. For example, the filler liquid could receive small pieces of plastic shavings, chips or the like, of thickness dimensions comparable to the thickness of the wire burr. These pieces, when flowing with the water column, will more readily carry along the burr wire. The plastic pieces are reusable. Additionally or in the alternative, foamable plastic may be added, and subsequent to the initial separation of the burr, the plastic is foamed so that the wire be embedded therein. The plastic with pressurized liquid and embedded wire is then removed with the liquid column. As the liquid may penetrate the foam, the engagement between liquid column and burr wire through the foamed coating on the latter is more intimate, and the wire will more readily follow the liquid column on its removal.

It can readily be seen that the method is applicable and usable for any length of tubing and at any time after the welding and after the burr has been scraped off the pipe wall but remains lodged in the tube as an elongated, wire-like object to be removed. This is particularly important, if the pipe is coiled when the burr-wire is still inside. The pressurized coiled water column, when discharged, will readily carry along the coiled wire to obtain its removal.

The invention is not limited to the embodiments described above, but all changes and modifications thereof not constituting departures from the spirit and scope of the invention are intended to be included.

I claim:

1. Method of removing the wire-like, internal welding seam burr having been severed and lying in the pipe, comprising the steps of filling the interior of the pipe over its entire length with liquid, adding small particles to the liquid, the particles having dimensions comparable to the thickness of the wire burr for being capable of carrying the burr during any flow of the liquid;

pressurizing the liquid in the pipe; and forcing the liquid out of the pipe under high pressure and as a liquid column, whereby the wire-like burr is fluid-dynamically embedded over its entire length in the particles in the liquid and is carried along by the particles and removed from the pipe.

2. Method as in claim 1, said small parts, being plastic particles, are added to the liquid prior removal.

3. Method of removing the wire-like, internal welding seam burr from the interior of a long pipe, the wire-like burr having been severed and lying in the pipe, comprising the steps of:

embedding the severed burr in foamed plastic capable of carrying the burr during any flow of the liquid;

filling the interior of the pipe over its entire length with liquid and pressuring the liquid in the pipe; and forcing the liquid out of the pipe under high pressure, and as a liquid column, whereby the wire-like burr is fluid-dynamically embedded over its entire length in the foam in the liquid and is carried along by the foam and removed from the pipe.

* * * * *